(12) United States Patent
Kim et al.

(10) Patent No.: US 8,586,217 B2
(45) Date of Patent: Nov. 19, 2013

(54) PROTECTIVE CIRCUIT MODULE

(75) Inventors: Ki-Woong Kim, Yongin-si (KR); Jae-Hoon Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 13/562,255

(22) Filed: Jul. 30, 2012

(65) Prior Publication Data
US 2013/0164568 A1 Jun. 27, 2013

Related U.S. Application Data

(60) Provisional application No. 61/579,502, filed on Dec. 22, 2011.

(51) Int. Cl.
*H01M 14/00* (2006.01)
*H01M 2/08* (2006.01)
*H01M 2/02* (2006.01)

(52) U.S. Cl.
USPC ................................ 429/7; 429/175; 429/178

(58) Field of Classification Search
USPC ............. 429/7, 158, 180, 182, 178, 175, 179; 361/777, 736; 174/250, 263, 262; 439/627, 55; 216/13
See application file for complete search history.

(56) References Cited

U.S. PATENT DOCUMENTS

| | | | |
|---|---|---|---|
| 2004/0137803 A1* | 7/2004 | Pitzele | 439/884 |
| 2008/0099237 A1* | 5/2008 | Nishi et al. | 174/264 |
| 2009/0124099 A1* | 5/2009 | Chen | 439/55 |
| 2009/0246615 A1* | 10/2009 | Park | 429/149 |
| 2010/0151282 A1* | 6/2010 | Koh et al. | 429/7 |
| 2010/0178549 A1* | 7/2010 | Moom | 429/158 |
| 2010/0291413 A1* | 11/2010 | Seo et al. | 429/7 |
| 2011/0129694 A1 | 6/2011 | Baek et al. | |
| 2012/0129011 A1* | 5/2012 | Park | 429/7 |

FOREIGN PATENT DOCUMENTS

KR 10-0965683 6/2010
KR 10-2011-0060787 6/2011

* cited by examiner

*Primary Examiner* — Patrick Ryan
*Assistant Examiner* — Kiran Quraishi
(74) *Attorney, Agent, or Firm* — Christie, Parker & Hale, LLP

(57) ABSTRACT

A battery module including a battery including a connection terminal; and a battery cell; and a protective circuit module including a printed circuit board having an inner surface that faces the battery, an outer surface that opposes the inner surface, and a terminal opening, and including a conductive pattern around a periphery of the terminal opening and an insulating part around the periphery of the terminal opening, wherein the connection terminal extends from the battery cell to the outer surface of the printed circuit board through the terminal opening, the conductive pattern is coupled with the battery cell through the connection terminal, and the insulating part contacts a portion of the conductive pattern that is closest to the terminal opening.

13 Claims, 6 Drawing Sheets

PROTECTIVE CIRCUIT MODULE

CROSS-REFERENCE TO RELATED PATENT APPLICATIONS

This application claims priority to and the benefit of U.S. Provisional Application No. 61/579,502, filed on Dec. 22, 2011, in the United States Patent and Trademark Office, the entire disclosure of which is incorporated herein by reference.

BACKGROUND

1. Field

An aspect of embodiments according to the present invention relates to a protective circuit module, and more particularly, to a protective circuit module for a battery.

2. Description of Related Art

A battery protective circuit module may prevent explosion, overheating, liquid leakage of a battery, or deterioration of charging/discharging characteristics by, for example, blocking an overcharge, overdischarge, overcurrent, short circuit, or reverse voltage of the battery. Hence, the battery protective circuit module may protect a user from dangerous occurrences and may extend the lifetime of the battery. Thus, a battery protective circuit module may improve charging/discharging efficiency of the battery, and may allow the battery to be used in a safe range so that an explosion, liquid leakage, or overheating of the battery does not occur.

A plurality of soldering operations may be performed so as to mount a plurality of components or devices (e.g., a battery pack) in (or on) the battery protective circuit module. Solderability may be deteriorated due to a difference in thermal conductivity between a circuit pattern formed on (or in) a substrate and a through hole of the substrate, through which a connection terminal (or tab) of a battery pack (or a terminal of each of the devices) passes. As a result, solder may flow down between a terminal hole and the connection terminal of the battery pack (or the terminal of each of the devices), and therefore, a product failure may occur.

SUMMARY

Aspects of embodiments of the present invention provide a conductive pattern of a protective circuit module, which may improve solderability of various types of devices mounted on the protective circuit module or a connection terminal of a battery pack.

Aspects of embodiments of the present invention also provide a conductive pattern of a protective circuit module, which may prevent a product failure from occurring due to solder flowing down after soldering is performed.

According to an aspect of embodiments of the present invention, there is provided a battery module including a battery including a connection terminal and a battery cell; and a protective circuit module including a printed circuit board having an inner surface that faces the battery, an outer surface that opposes the inner surface, and a terminal opening; and including a conductive pattern around a periphery of the terminal opening; and an insulating part around the periphery of the terminal opening, wherein the connection terminal extends from the battery cell to the outer surface of the printed circuit board through the terminal opening, the conductive pattern is coupled with the battery cell through the connection terminal, and the insulating part contacts a portion of the conductive pattern that is closest to the terminal opening.

The insulating part may include at least a portion interposed between the conductive pattern and the terminal opening.

The conductive pattern may be on a surface of the printed circuit board.

The conductive pattern may be at least partially embedded into the printed circuit board.

An inner surface of at least a portion of the insulating part may surround the terminal opening. In an embodiment, a width of the at least the portion of the insulating part is between about 0.1 mm and about 0.2 mm. In an embodiment, the insulating part further includes another portion on the at least the portion around the periphery of the terminal opening.

The insulating part may include an insulation coating layer at a portion of the printed circuit board nearest to the terminal opening. In an embodiment, the insulation coating layer is on an upper surface of the conductive pattern.

A solder coating layer may be on the conductive pattern.

The protection circuit module may further include a protection circuit configured to protect the battery in charging and discharging, the protection circuit being electrically coupled to the conductive pattern.

The printed circuit board may include a plurality of conductive patterns including the conductive pattern and a plurality of insulating parts including the insulating part. In one embodiment, the insulating parts and the conductive patterns are on the inner and outer surfaces of the printed circuit board.

According to another aspect of embodiments of the present invention, there is provided a method of manufacturing a protective circuit module for a battery. In an embodiment, the method includes placing a mask on a conductive layer at a region of a first side of a printed circuit board substrate at which a conductive pattern is to be formed; removing portions of the conductive layer of the substrate not covered by the mask by immersing the substrate in an etchant; removing the mask to expose a remaining portion of the conductive layer as the conductive pattern; and forming a terminal opening configured to receive a connection terminal of the battery at a portion of the substrate, wherein the conductive pattern is around a periphery of the terminal opening and configured to couple to the connection terminal; and an insulating part is around the periphery of the terminal opening, wherein the insulating part contacts a portion of the conductive pattern that is closest to the terminal opening.

A mask may include a resist printed on the printed circuit board substrate.

The method may further include placing an insulation coating layer on an upper surface of the conductive pattern to form at least a portion of the insulating part.

In an embodiment, the mask is not placed at a region in which the insulating part is to be formed; and removing the portions of the conductive layer not covered by the mask by immersing the substrate in an etchant forms the insulating part. The method may further include placing an insulation coating layer on an upper surface of the insulating part to form at least a portion of the insulating part. The mask may be placed so as to form a plurality of conductive patterns including the conductive pattern and a plurality of insulating parts including the insulating part. The method may further include placing another mask on a second conductive layer on a second side of the substrate to form the conductive patterns and the insulating parts on the second side of the substrate.

According to aspects of embodiments of the present invention, when various types of devices are mounted on the protective circuit module or when connection terminals respectively extended from battery cells are coupled to the protective circuit module, the heat transfer of a solder may be controlled by an insulating part at a terminal opening, thereby improving solderability.

Further, the heat transfer of the solder may be relatively rapidly decreased by the insulating part at the terminal opening, so that it is possible to prevent (or inhibit) the solder from flowing down.

BRIEF DESCRIPTION OF THE DRAWINGS

The accompanying drawings, together with the specification, illustrate exemplary embodiments of the present invention, and, together with the description, serve to explain aspects of embodiments of the present invention. It will be understood that these drawings depict only certain embodiments in accordance with the disclosure and, therefore, are not to be considered as limiting the scope of the present invention.

DETAILED DESCRIPTION

Figure 1:
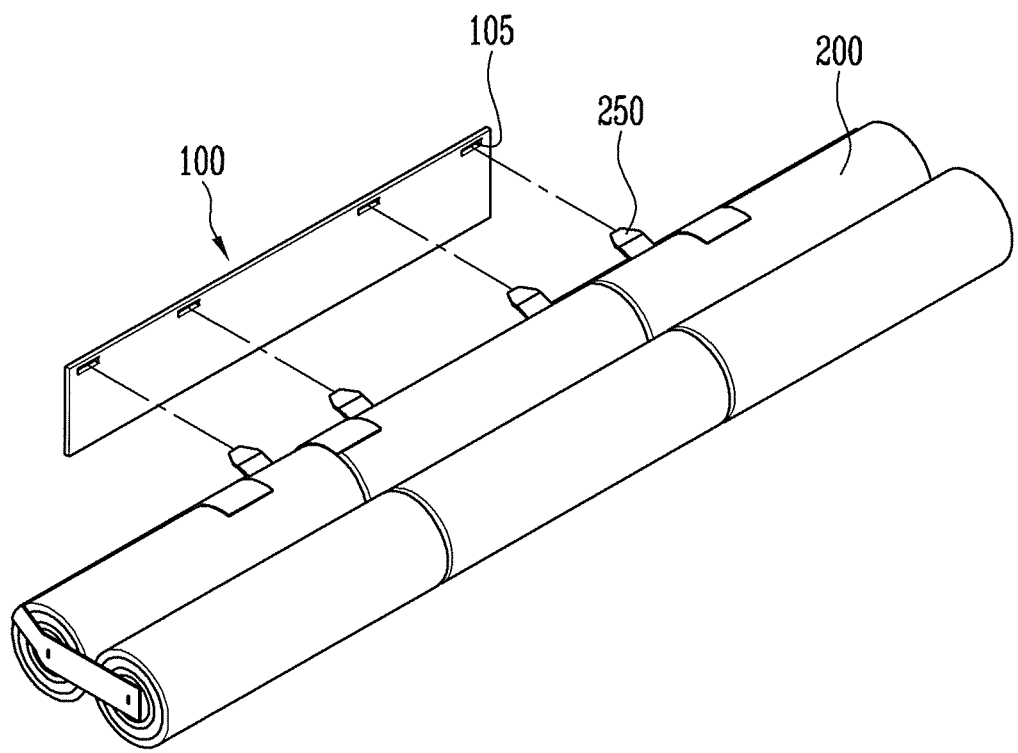
FIG. 1 is an exploded perspective view illustrating a battery module including a battery and a protective circuit module coupled to each other according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it may be directly on the another element or be indirectly on the another element with one or more intervening elements interposed therebetween. Also, when an element is referred to as being "coupled to" another element, it may be directly coupled to the another element or be indirectly coupled to the another element with one or more intervening elements interposed therebetween. Hereinafter, like reference numerals refer to like elements. Certain embodiments will be described in more detail with reference to the accompanying drawings, so that a person having ordinary skill in the art may readily make and use aspects of the present disclosure.

Figure 2A:
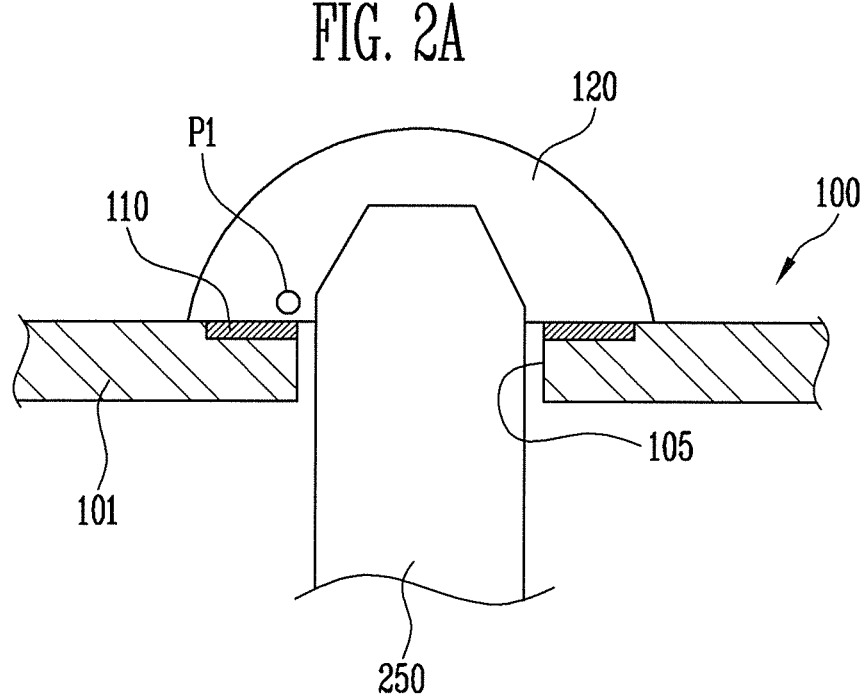
FIG. 2A is a partial longitudinal sectional view illustrating a battery module including a connection terminal coupled to a protective circuit module according to an embodiment of the present invention.
Figure 2B:
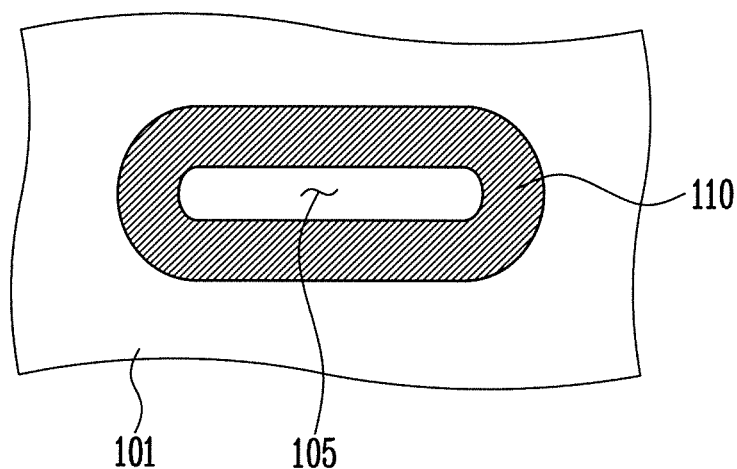
FIG. 2B is a partial plan view illustrating the protective circuit module in FIG. 2A.

FIG. 1 is an exploded perspective view illustrating a battery module including a battery and a protective circuit module coupled (e.g., connected) to each other according to an embodiment of the present invention. FIG. 2A is a partial longitudinal sectional view illustrating a battery module including a connection terminal coupled (e.g., connected or fixed) to a protective circuit module according to an embodiment of the present invention. FIG. 2B is a partial plan view illustrating the protective circuit module in FIG. 2A.

A protective circuit module 100 may be formed by mounting a module for performing a charging/discharging operation and performing communication with an outside on a printed circuit board 101, and a protection circuit for securing safety in the process of performing the charging/discharging operation is mounted on the printed circuit board 101. In an embodiment, the protective circuit module 100 is provided with a terminal opening (e.g., a terminal hole) 105 through which the protective circuit module 100 is coupled (e.g., connected) to each battery cell (e.g., bare cell) 200. Each of the battery cells 200 is electrically coupled (e.g., connected) to a connection terminal (e.g., tab or connection tab) 250 provided to the protective circuit module 100 through conductors (e.g., electrical conducting wires), such as nickel tabs. One side of the connection terminals 250 coupling (e.g., connecting) terminals of the battery cells 200 in parallel or series to one another are connected (e.g., soldered or welded) to the corresponding protective circuit module, thereby coupling the connection terminals 250 to the printed circuit board 101 (e.g., a circuit printed in (or on) the protective circuit module 100). The connection terminal 250 may be formed of a material such as nickel (Ni).

The terminal opening 105 is formed so that a component terminal (not shown) or the connection terminal 250 of the battery cell 200 may be mounted to the protective circuit module 100 therethrough. A conductive pattern (e.g., a pattern part) 110 may be formed as, for example, a circuit pattern, around the terminal opening 105. In an embodiment, the conductive pattern 110 is soldered in a state in which the connection terminal 250 is inserted into the terminal opening 105.

Figure 2C:
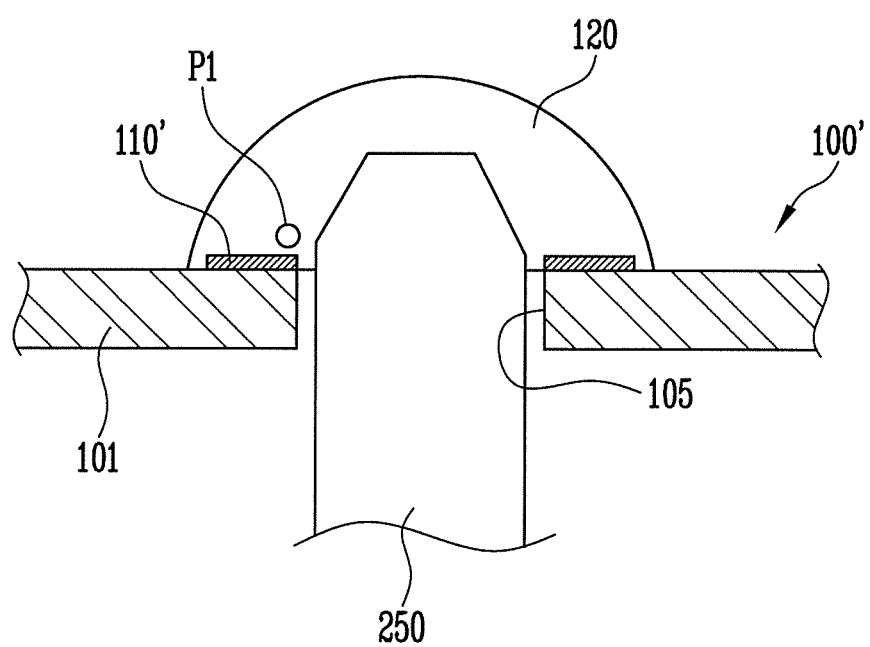
FIG. 2C is a partial longitudinal sectional view illustrating a battery module including a conductive pattern on a surface of a protective circuit module and a connection terminal coupled to the protective circuit module according to another embodiment of the present invention.

A protective circuit module according to another embodiment of the present invention will be described with reference to FIG. 2C. FIG. 2C is a partial longitudinal sectional view illustrating a battery module including a conductive pattern on a surface of a protective circuit module and a connection terminal coupled to the protective circuit module according to another embodiment of the present invention.

With reference to FIG. 2C, since a protective circuit module 100' according to the present embodiment of the present invention may include the same (or substantially the same) structure as the protective circuit module 100 except for the structure of a conductive pattern 110', descriptions of certain aspects of the protective circuit module 100' are given by way of reference to the protective circuit module 100 and will not be described in detail herein.

In the present embodiment, the protective circuit module 100' is provided with a terminal opening 105 through which the protective circuit module 100' may be coupled to each battery cell 200 via the connection terminal 250. The conductive pattern 110' may be disposed on a surface (e.g., a top surface) of the printed circuit board 101. The conductive pattern 110' may be coupled to (e.g., soldered to) the connection terminal 250 in a state in which the connection terminal 250 is inserted into the terminal opening 105.

In (or on) the printed circuit board 101, a pattern is formed by, for example, performing exposure and etching operations on a copper clad laminated (CCL) plate obtained by coating a copper foil on one or both surfaces of an insulating substrate. An example of this operation will be described in detail as follows.

In one embodiment, a foil (e.g. a copper foil) is attached to a substrate (e.g., a thin substrate made of epoxy or Bakelite resin) that is an insulator, and a mask (e.g., a resist) is then disposed (e.g., printed) on the copper foil (e.g., disposed in a suitable pattern to form a printed circuit (e.g., the conductive pattern)). That is, the resist may be printed on a part at which the printed circuit is to be formed in the region covered with the copper foil.

The printed substrate may then be immersed in an etchant capable of melting copper. The etchant melts (e.g., etches) the copper except at the parts on which the resist is printed, i.e., the part at which the printed circuit is to be formed.

The resist may then be removed, so that the copper foil remains in the shape of a suitable (e.g., desired) printed circuit (e.g., conductive pattern).

A terminal opening (e.g., a hole) may be punched at a part through which a component is configured to pass as described above, and a resist (e.g., a blue lead resist) may be printed at a region in which a conductive material (e.g. lead) may not be coated.

In an embodiment, in order to form the conductive pattern 110', a resister is printed (e.g., previously printed) in a range having, for example, a width (e.g., a diameter) greater than that of the terminal opening 105 on the region in which the conductive pattern 110' is to be formed, and the printed substrate is then immersed in the etchant. If the printed substrate is immersed in the etchant, the copper foil of the conductive pattern 110' remains in a state in which the copper foil of the conductive pattern 110' is not removed due to the resist printed on the region of the conductive pattern 110'. If the terminal opening 105 is punched, the conductive pattern 110' (or 110) may be formed around the terminal opening 105 as shown in FIGS. 2A, 2B and 2C.

However, since the solidification of a solder 120 soldered to a portion (e.g., a top) of the conductive pattern 110 or 110' may be started from the outside, an upper edge part P1 of the terminal opening 105 may become a part at which the temperature is the highest in the solder 120. Although the solder 120 may be solidified (e.g., rapidly solidified) while being cooled by contact with the connection terminal 250, the solder may not solidify as readily by the heat conduction of the conductive pattern 110 and may flow down between the connection terminal 250 and the terminal opening 105.

Figure 3A:
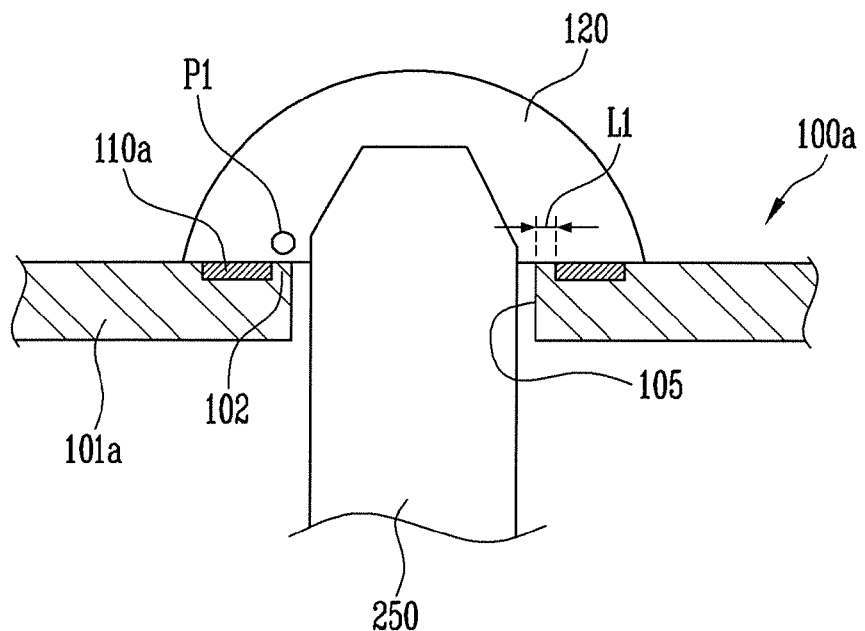
FIG. 3A is a partial longitudinal sectional view illustrating a battery module including a connection terminal coupled to a protective circuit module according to still another embodiment of the present invention.
Figure 3B:
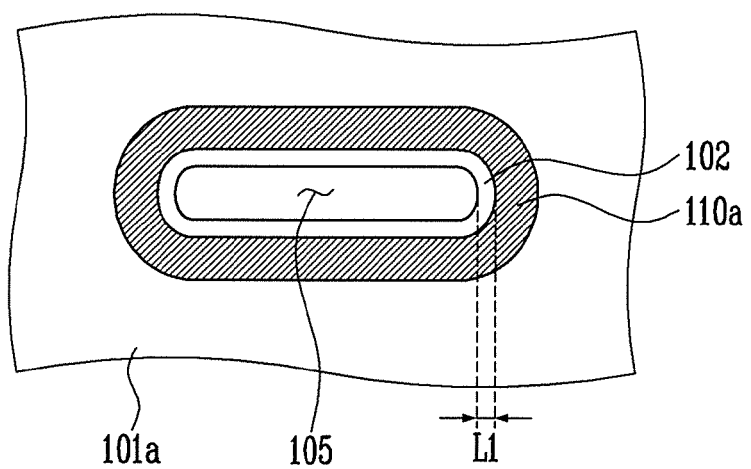
FIG. 3B is a partial plan view illustrating the protective circuit module in FIG. 3A.

A protective circuit module according to another embodiment of the present invention will be described with reference to FIGS. 3A and 3B. FIG. 3A is a partial longitudinal sectional view illustrating a battery module including a connection terminal coupled to a protective circuit module according to still another embodiment of the present invention. FIG. 3B is a partial plan view illustrating the protective circuit module in FIG. 3A.

A circuit pattern may be formed along a circuit wire in a printed circuit board 101a. The terminal opening 105 may be formed so that a component terminal (not shown) or the connection terminal 250 of each battery cell 200 may be mounted to the protective circuit module therethrough.

The conductive pattern 110a may be formed around the terminal opening 105 as a circuit pattern. The conductive pattern 110a may be coupled (e.g., electrically connected) to the connection terminal 250 by being soldered in a state in which the connection terminal 250, or the like, is inserted into the terminal opening 105.

In an embodiment, an insulating part (e.g., an insulator, or insulating region of the printed circuit board) 102 is a part provided between the terminal opening 105 and the conductive pattern 110a, in which the circuit pattern (e.g., the conductive pattern 110a) is not formed. The insulating part 102 may be formed of a material having a property substantially identical or electrically similar to that of the printed circuit board 101a. The insulating part 102 is insulated from the conductive pattern 110a. In an embodiment, the insulating part 102 may be formed at a part greater than the half of the width (e.g., the radius) of the terminal opening 105 and smaller than the minimum width (e.g., diameter) of the conductive pattern 110a. In addition, an insulation coating layer 103 may be formed on a surface (e.g., an upper surface) of the insulating part 102.

The difference L1 between the maximum and minimum width (e.g., radii) of the insulating part 102 may be at or between about 0.1 to about 0.2 mm. In an embodiment, if the difference L1 between the maximum and minimum width (e.g., radii) of the insulating part 102 is less than about 0.1 mm, the difference L1 may be within a manufacturing error range of the protective circuit module when the conductive pattern 110a is formed and the connection terminal 250 is inserted into the terminal opening 105, and, therefore, the insulation effect may not be ensured. On the other hand, in an embodiment, if the difference L1 between the maximum and minimum width (e.g., radii) of the insulating part 102 is greater than about 0.2 mm, the interval between the connection terminal 250 and the conductive pattern 110a is increased, and, therefore, when the connection terminal 250 and the conductive pattern 110a are heated (e.g., concurrently or simultaneously heated using a soldering iron), the working speed (e.g., soldering speed or heat transfer rate) may be negatively affected.

A solder coating layer (not shown) may be further formed on the conductive pattern 110a. A soldering or solder coating operation may be performed on the conductive pattern 110a so as to form a metal bonding between the conductive pattern 110a and the solder, thereby decreasing soldering time in the process of coupling a battery.

If the circuit pattern is formed on both surfaces of the printed circuit board 101a, the conductive pattern 110a and the insulating part 102 may be formed on both the surfaces of the printed circuit board 101a.

Figure 3C:
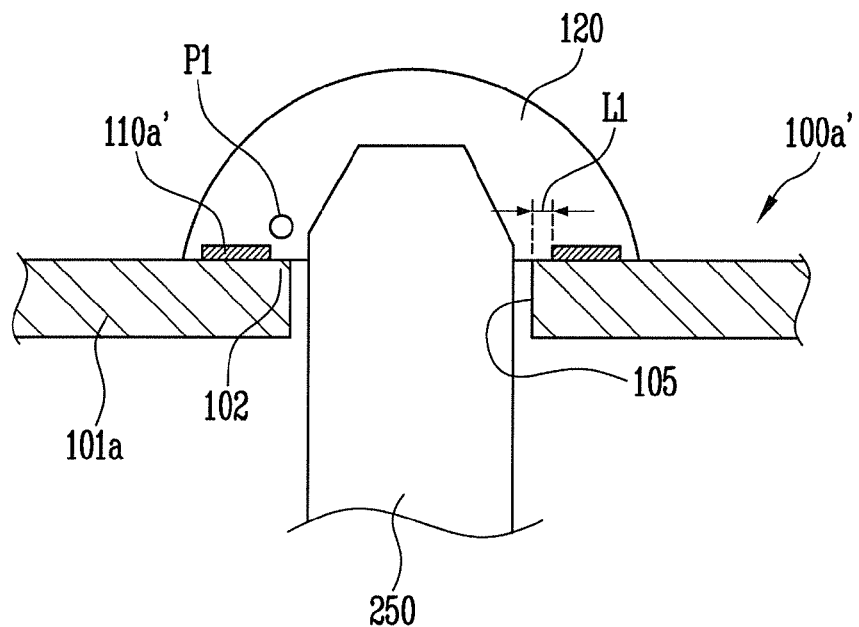
FIG. 3C is a partial longitudinal sectional view illustrating a battery module including a conductive pattern on a surface of a protective circuit module and a connection terminal coupled to the protective circuit module according to still another embodiment of the present invention.

A protective circuit module according to another embodiment of the present invention will be described with reference to FIG. 3C. FIG. 3C is a partial longitudinal sectional view illustrating a battery module including a conductive pattern on a surface of a protective circuit module and a connection terminal coupled to the protective circuit module according to still another embodiment of the present invention.

With reference to FIG. 3C, since a protective circuit module 100a' according to the present embodiment of the present invention may include the same (or substantially the same) structure as the protective circuit module 100a except for the structure of a conductive pattern 110a', descriptions of certain aspects of the protective circuit module 100a' are given by way of reference to the protective circuit module 100a and will not be described in detail herein.

In the present embodiment, the protective circuit module 100a' is provided with a terminal opening 105 through which the protective circuit module 100a' may be coupled to each battery cell 200 via the connection terminal 250. The conductive pattern 110a' may be disposed on a surface (e.g., a top surface) of the printed circuit board 101. The conductive pattern 110a' may be coupled to (e.g., soldered to) the connection terminal 250 in a state in which the connection terminal 250 is inserted into the terminal opening 105.

A method of forming the conductive pattern and the insulating part according to the embodiment of the present invention illustrated in FIG. 3C will be described briefly.

In this embodiment, a mask (e.g. a resist) is printed in a region in which a circuit pattern (e.g., a conductive pattern) is to be formed on a substrate (e.g., a thin substrate made of epoxy or Bakelite resin) that is an insulator having a foil (e.g., a copper foil) attached thereto. In an embodiment, the resist is disposed (e.g., printed) at a region in which the conductive pattern 110a' is to be formed, and the resist is not printed at a region in which the insulating part 102 is to be formed. The copper foil may then be removed, except at the region in which the resist is printed, by immersing the printed substrate in an etchant. Accordingly, the resist is removed so that the circuit pattern is formed by the remaining copper pattern. In this embodiment, the copper foil remains at the region in which the resist is formed, so that the conductive pattern 110a' is formed. Further, the copper foil is removed at the region in which the insulating part 102 not covered with the resist is formed, so that the insulating part 102 is formed. A terminal opening (e.g., a hole) may be formed at a part into which each component is configured to be inserted therethrough.

When the insulating part 102 is formed as shown in FIG. 3A, 3B, or 3C, heat conduction (e.g., heat transfer) to an upper edge part P1 of the terminal opening 105 may be inhibited (e.g., partially inhibited or reduced in comparison to arrangements without an insulating part 102) by the conduction of the conductive pattern 110a'. Hence, the solder at the upper edge part of the terminal opening 105 may be solidified (e.g., relatively rapidly solidified) by contact with the connection terminal 250, and thus may not flow down along the terminal opening 105.

Figure 4A:
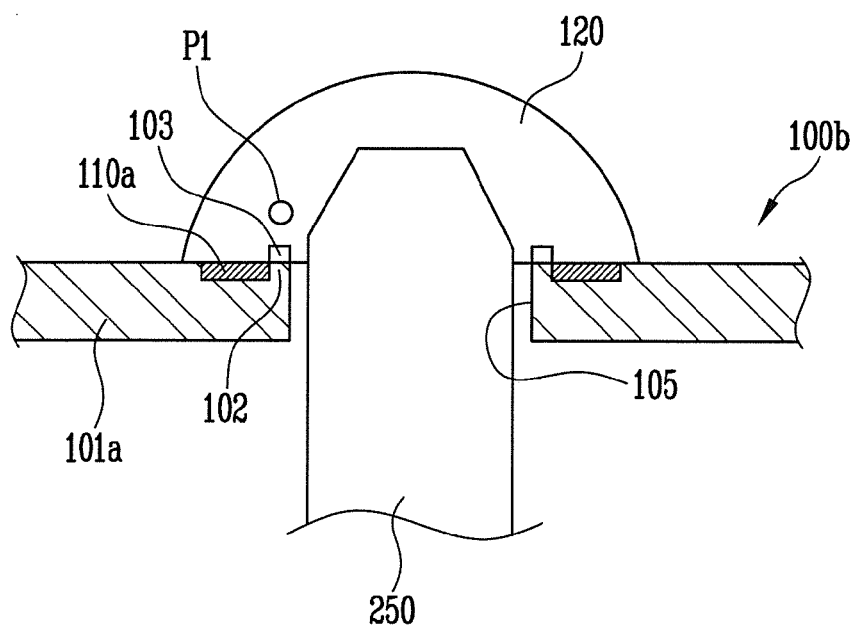
FIG. 4A is a partial longitudinal sectional view illustrating a battery module including a connection terminal coupled to a protective circuit module according to still another embodiment of the present invention.

A protective circuit module according to another embodiment of the present invention will be described with reference to FIG. 4A. FIG. 4A is a partial longitudinal sectional view illustrating a battery module including a connection terminal coupled to a protective circuit module according to still another embodiment of the present invention.

A protective circuit module 100b according to this embodiment is different from the protective circuit module shown in FIGS. 3A and 3B, for example, in that an insulation coating layer 103 is further formed. The insulation coating layer 103 may be formed on a surface (e.g., an upper surface) of the insulating part 102. The insulation coating layer 103 may be further formed, so that the contact surface area of the solder 120 is relatively increased (e.g., increased relative to some arrangements without an insulation coating layer 103). The contact area of the solder 120 with the printed circuit board 101a may be increased in a state in which the solder 120 is melted before the solidification of the solder 120. Therefore, the solder 120 may be relatively strongly condensed by a surface tension as compared with the solder in the embodiment shown in FIGS. 3A and 3B, and the phenomenon in which the solder 120 flows down through the terminal opening 105 may be reduced (e.g., inhibited or weakened). Since the contact area of the solder 120 with the printed circuit board 101a is relatively increased, the solder 120 may be more rapidly solidified by the cooling at an upper part P1 of the insulation coating layer 103.

Figure 4B:
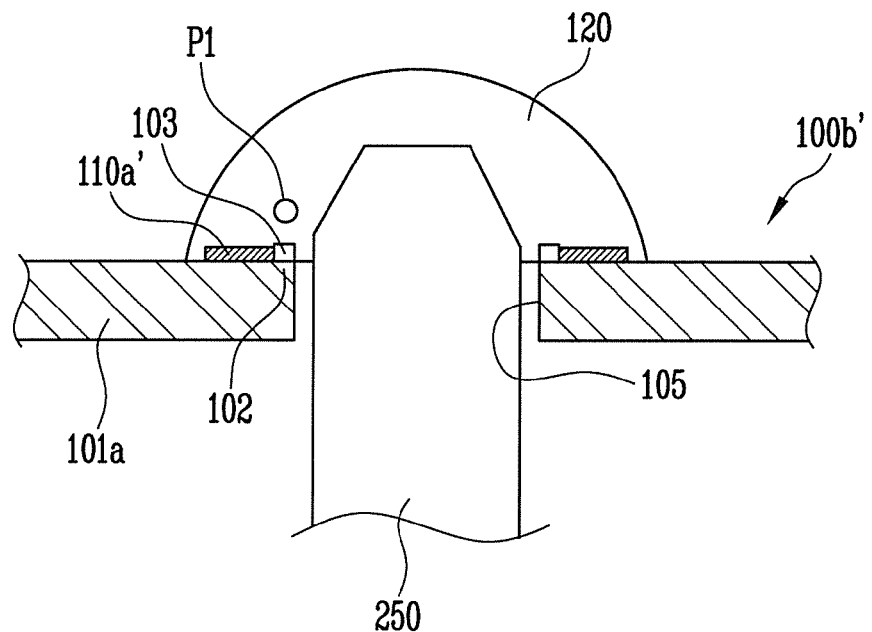
FIG. 4B is a partial longitudinal sectional view illustrating a battery module including a conductive pattern on a surface of a protective circuit module and a connection terminal coupled to the protective circuit module according to still another embodiment of the present invention.

A protective circuit module according to another embodiment of the present invention will be described with reference to FIG. 4B. FIG. 4B is a partial longitudinal sectional view illustrating a battery module including a conductive pattern on a surface of a protective circuit module and a connection terminal coupled to the protective circuit module according to still another embodiment of the present invention.

With reference to FIG. 4B, since a protective circuit module 100b' according to the present embodiment of the present invention may include the same (or substantially the same) structure as the protective circuit module 100b except for the structure of a conductive pattern 110a', descriptions of certain aspects of the protective circuit module 100b' are given by way of reference to the protective circuit module 100b and will not be described in detail herein In the present embodiment, the protective circuit module 100b' is provided with a terminal opening 105 through which the protective circuit module 100b' may be coupled to each battery cell 200 via the connection terminal 250. The conductive pattern 110a' may be disposed on a surface (e.g., a top surface) of the printed circuit board 101. The conductive pattern 110a' may be coupled to (e.g., soldered to) the connection terminal 250 in a state in which the connection terminal 250 is inserted into the terminal opening 105.

A method of forming the conductive pattern and the insulating part according to the embodiment of the present invention illustrated in FIG. 4B will be described briefly.

The insulating coating layer 103 may be formed by performing an additional operation in the method of manufacturing the protective circuit module in the embodiment shown in FIG. 3C, described above. That is, an insulation coating layer may formed by the additional operation of depositing a coating (or layer) having insulating properties (e.g., a material electrically similar to the substrate) on the substrate.

Figure 5A:
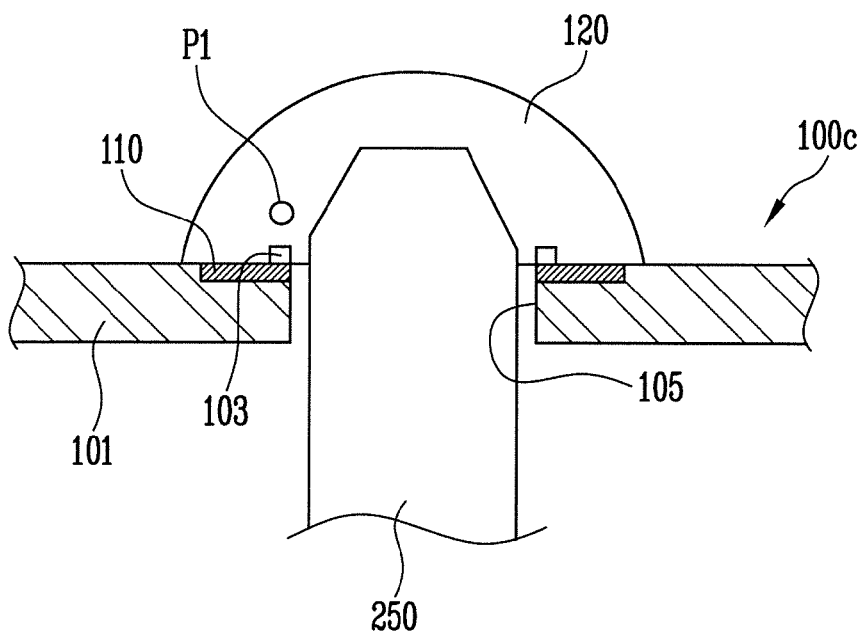
FIG. 5A is a partial longitudinal sectional view illustrating a battery module including a connection terminal coupled to a protective circuit module according to still another embodiment of the present invention.

A protective circuit module according to still another embodiment of the present invention will be described with reference to FIG. 5A. FIG. 5A is a partial longitudinal sectional view illustrating a battery module including a connection terminal coupled to a protective circuit module according to still another embodiment of the present invention.

In this embodiment, an insulation coating layer 103 is formed on a protective circuit module 100c, the protective circuit module 100c may be otherwise similar to the protective circuit module 100 formed according to the embodiment shown in FIGS. 2A and 2B. That is, the insulation coating layer 103 is formed on a surface (e.g., a top surface) of the conductive pattern 110 in a state in which an insulating part is not interposed between the conductive pattern 110 and the terminal opening 105.

Figure 5B:
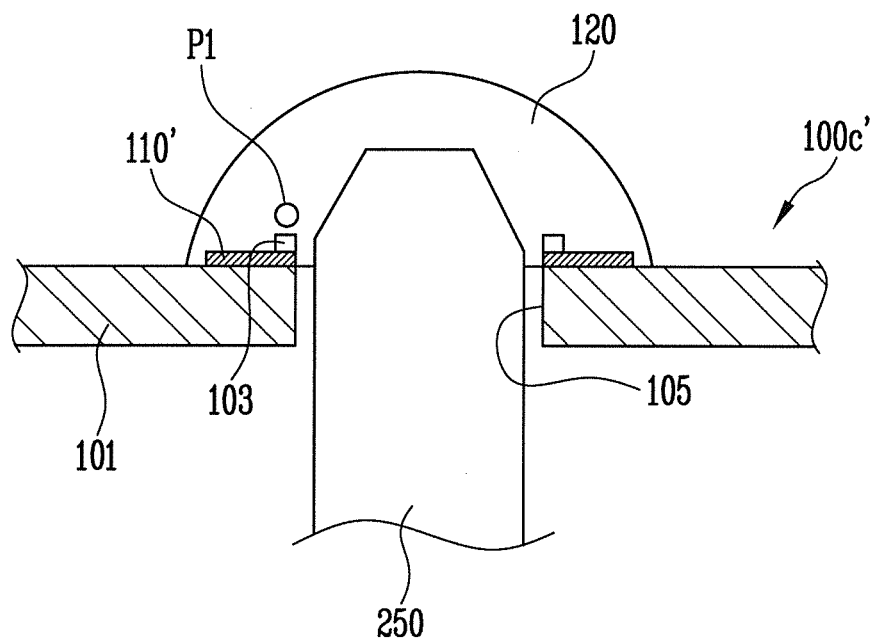
FIG. 5B is a partial longitudinal sectional view illustrating a battery module including a conductive pattern on a surface of a protective circuit module and a connection terminal coupled to the protective circuit module according to still another embodiment of the present invention.

A protective circuit module according to another embodiment of the present invention will be described with reference to FIG. 5B. FIG. 5B is a partial longitudinal sectional view illustrating a battery module including a conductive pattern on a surface of a protective circuit module and a connection terminal coupled to the protective circuit module according to still another embodiment of the present invention.

With reference to FIG. 5B, since a protective circuit module 100c' according to the present embodiment of the present invention may include the same (or substantially the same) structure as the protective circuit module 100c except for the structure of a conductive pattern 110', descriptions of certain aspects of the protective circuit module 100c' are given by way of reference to the protective circuit module 100c and will not be described in detail herein.

In the present embodiment, the protective circuit module 100c' is provided with a terminal opening 105 through which the protective circuit module 100c' may be coupled to each battery cell 200 via the connection terminal 250. The conductive pattern 110' may be disposed on a surface (e.g., a top surface) of the printed circuit board 101. The conductive pattern 110' may be coupled to (e.g., soldered to) the connection terminal 250 in a state in which the connection terminal 250 is inserted into the terminal opening 105.

A method of manufacturing the protective circuit module 100c' according to this embodiment will be described as follows.

In an embodiment, a mask (e.g., a resist) is disposed (e.g., printed) at a region in which a circuit pattern is to be formed on a substrate (e.g., a thin substrate made of epoxy or Bakelite resin) that is an insulator having a foil (e.g., a copper foil) attached thereto. In an embodiment, the resist is printed at a region in which the conductive pattern is to be formed. The copper foil may be removed, except the region in which the resist is printed, by immersing the printed substrate in an etchant. The resist is removed so that the circuit pattern is formed by the remaining copper pattern. A terminal opening (e.g., a hole) may be formed at a part into which each component is configured to be inserted therethrough, and the insulation coating layer 103 may be formed on an innermost side of the conductive pattern 110'.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery module comprising:
   a battery comprising:
      a connection terminal; and
      a battery cell; and
   a protective circuit module comprising a printed circuit board having:
      an inner surface that faces the battery;
      an outer surface that opposes the inner surface; and
      a terminal opening, and comprising:
      a conductive pattern around a periphery of the terminal opening; and
      an insulating part around the periphery of the terminal opening, wherein
   the connection terminal extends from the battery cell to the outer surface of the printed circuit board through the terminal opening,
   the conductive pattern is coupled with the battery cell through the connection terminal,
   the insulating part contacts a portion of the conductive pattern that is closest to the terminal opening,
   at least a portion of the insulating part defines the terminal opening, and
   a top surface of the insulation part that is adapted for contacting solder is in one plane.

2. The battery module of claim 1, wherein the insulating part comprises at least a portion interposed between the conductive pattern and the terminal opening.

3. The battery module of claim 1, wherein the conductive pattern is on a surface of the printed circuit board.

4. The battery module of claim 1, wherein the conductive pattern is at least partially embedded into the printed circuit board.

5. The battery module of claim 1, wherein an inner surface of at least a portion of the insulating part surrounds the terminal opening.

6. The battery module of claim 5, wherein a width of the at least the portion of the insulating part is between about 0.1 mm and about 0.2 mm.

7. The battery module of claim 5, further comprising an insulation coating layer on at least a portion of the insulation layer at the periphery of the terminal opening.

8. The battery module of claim 1, further comprising an insulation coating layer at a portion of the printed circuit board nearest to the terminal opening.

9. The battery module of claim 8, wherein the insulation coating layer is on an upper surface of the conductive pattern.

10. The battery module of claim 1, wherein a solder coating layer is on the conductive pattern.

11. The battery module of claim 1, wherein the protection circuit module further comprises a protection circuit configured to protect the battery in charging and discharging, the protection circuit being electrically coupled to the conductive pattern.

12. The battery module of claim 1, wherein the printed circuit board comprises a plurality of conductive patterns comprising the conductive pattern and a plurality of insulating parts comprising the insulating part.

13. The battery module of claim 12, wherein
   the insulating parts and the conductive patterns are on the inner and outer surfaces of the printed circuit board.

* * * * *

UNITED STATES PATENT AND TRADEMARK OFFICE
CERTIFICATE OF CORRECTION

| | |
|---|---|
| PATENT NO. | : 8,586,217 B2 |
| APPLICATION NO. | : 13/562255 |
| DATED | : November 19, 2013 |
| INVENTOR(S) | : Ki-Woong Kim et al. |

It is certified that error appears in the above-identified patent and that said Letters Patent is hereby corrected as shown below:

In the Claims

Column 10, Claim 11, line 38    Delete "protection"

Insert -- protective --

Signed and Sealed this
Second Day of June, 2015

Michelle K. Lee
*Director of the United States Patent and Trademark Office*